(12) United States Patent
Gupta et al.

(10) Patent No.: US 7,974,733 B2
(45) Date of Patent: Jul. 5, 2011

(54) AUTOMATIC ESTIMATION OF WELDGUN SIZE USING SECTION GEOMETRY

(75) Inventors: Ashish Gupta, Bangalore (IN); Gopalakrishna Shastry, Bangalore (IN); Narahari K. Hunsur, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 366 days.

(21) Appl. No.: 12/363,244

(22) Filed: Jan. 30, 2009

(65) Prior Publication Data

US 2010/0198384 A1 Aug. 5, 2010

(51) Int. Cl.
*G06F 19/00* (2011.01)
*B23K 9/12* (2006.01)
*B23K 33/00* (2006.01)
*B23K 35/30* (2006.01)
*B23K 9/00* (2006.01)
*B23K 9/28* (2006.01)
*B23K 13/01* (2006.01)

(52) U.S. Cl. .............. 700/179; 219/137 R; 219/137.31; 219/125.1; 219/617

(58) Field of Classification Search ................ 700/117, 700/159, 179, 245, 262; 219/61.5, 86.1, 219/91.1, 121.45, 125.1, 136, 137 R, 137.31, 219/617

See application file for complete search history.

(56) References Cited

U.S. PATENT DOCUMENTS

| | | | | |
|---|---|---|---|---|
| 5,412,172 A * | 5/1995 | Ichikawa et al. | ........... | 219/86.41 |
| 5,910,719 A * | 6/1999 | Thorne | ......................... | 318/560 |
| 6,398,102 B1 | 6/2002 | Cao et al. | | |
| 6,531,674 B2 * | 3/2003 | Suita | ........................ | 219/86.41 |
| 7,738,996 B2 * | 6/2010 | Luthardt | ....................... | 700/245 |
| 2005/0029326 A1 | 2/2005 | Henrikson | | |
| 2005/0040208 A1 | 2/2005 | Subrahmanyam | | |
| 2007/0075048 A1 * | 4/2007 | Kunisaki et al. | ............. | 219/91.1 |

FOREIGN PATENT DOCUMENTS

JP 2009160636 A * 7/2009

OTHER PUBLICATIONS

Nelaturi et al., "Feasible spaces in weld gun selection", IEEE International Conference on Automation Science and Engineering, Publication Year: 2008, pp. 870-875.*

* cited by examiner

*Primary Examiner* — Crystal J Barnes-Bullock
(74) *Attorney, Agent, or Firm* — John A. Miller; Miller IP Group, PLC

(57) ABSTRACT

A method for estimating a plurality of geometrical parameters defining the size of a weld gun that has particular application for automatically selecting a weld gun for a welding operation. The method includes iteratively estimating a plurality of geometric parameters based on part section curves corresponding to a direction of approach of the weld gun to weld point of the plurality of weld points. Thereafter, a set of valid weld gun sizes are calculated based on the estimated plurality of geometric parameters. Similarly all the valid weld gun sizes are calculated corresponding to each of the weld gun approach direction. Further, each set of the valid gun sizes are estimated for each of the weld point for the welding operation. Finally, a weld gun for performing the welding operation is selected based on the set of weld gun sizes corresponding to the welding operation.

20 Claims, 7 Drawing Sheets

AUTOMATIC ESTIMATION OF WELDGUN SIZE USING SECTION GEOMETRY

BACKGROUND OF THE INVENTION

1. Field of the Invention

This invention relates generally to a method for automatically selecting a welding gun for a welding operation and, more particularly, to a method for estimating the geometrical parameters defining the size of a welding gun suitable for a welding operation.

2. Description of the Related Art

Welding is sometimes performed to join two parts together. There are various types of welding technique, such as electric arc welding and resistance spot welding. Resistance spot welding is the most common joining operation used in automotive assembly line. In resistance spot welding process, the welding is performed by placing the parts to be joined together between the electrodes of a weld gun and an electric current is passed through the electrodes. The parts are welded due to the high temperature caused by the resistance to electric current flow of the electrodes. In an automotive assembly line, parts are joined at various weld points with a variety of orientations during a weld operation.

In a typical vehicle, the number of weld points are several thousand. To balance work across assembly line stations, these weld points are grouped into sets of six to eight weld points each called weld operations, where a single weldgun on a single robot perform welding at weld points belonging to a single weld operation. Selection of a weld gun for a specific welding operation depends on a set of operational and geometric constraints. The process constraints depend on material stack up and the geometric constrains depend on the geometry of parts and tools/fixtures near the weld point.

Current methods of weld gun selection typically employs software (UG-NX) assisted manual process. An engineer selects weld guns iteratively based on previous experience and by taking measurements from 2-D sections manually. However, this method is time consuming and also requires manual iterations for selecting the correct weld gun. Further, the weld gun selected using this method can fail while validating the weld gun for all the weld points of a welding operation. The weld gun is validated by manually operating the selected weld gun at the weld point such that the weld gun does not interfere With the geometry of any part. Moreover, the method doesn't provide information about all the directions in which the weld gun can approach the weld point.

Another way to perform weld gun selection is to use eM-Simulate's weld gun selection capability. But that too is necessarily a validation approach rather than a selection approach. The eM-Simulate method is a brute force method of validating each of the weld guns in a library of weld guns against all of the weld operations by performing successive interference checks around the weld points. This method is time consuming and does not capture the complete solution space available for the valid weld gun sizes for a given set of weld operations.

SUMMARY OF THE INVENTION

In accordance with the teachings of the present invention, a method for estimating geometrical parameters defining the size of a weld gun suitable for a welding operation is disclosed. The method includes generating part section curves corresponding to a direction of approach of the weld gun to a weld point in the welding operation. Then, a value of the tip angle of a weld gun shank is determined for both arms of the weld gun based on the presence of the part section curves in a three-dimensional cylindrical zone around the weld point. Further, minimum and maximum limits for the arm stick-out are estimated based on the value of the tip angles required and the type of weld gun used. Thereafter, minimum and maximum limits for arm offset are calculated for both arms of the weldgun based on the value of the tip angle of the shank of the weld gun, and the presence of part section curves between the maximum and the minimum value limits of the arm stick-out, estimated above. A valid maximum and minimum value of the arm offset are obtained based on standard weld gun sizes available. Thereafter, the maximum and minimum limits for the arm stick-out are computed and updated based on the part section curves between the valid maximum limits of the arm offset for the two weld gun arms. A valid maximum and minimum value of the arm stick-out are obtained based on standard weld gun sizes available.

The above described procedure of calculation of the arm stick-out limits and arm offset limits is repeated with the modified values of each, until each of the valid values of the arm stick-out limits and the arm offset limits converge to a corresponding single value. The value of the tip angle of the shank, the converged valid minimum value and the converged valid maximum value of the arm stick-out and arm offset are the final values of the plurality of geometric parameters. A set of valid weld gun sizes corresponding to a weld gun approach direction to the weld point is then selected by mapping the final values of the plurality of geometric parameters onto a set of standard weld guns of the type of weld gun being used.

The above described procedure is repeated for each of the weld gun approach directions to the weld point of the plurality of weld points and a set of weld gun sizes corresponding to the weld point is obtained based on the set of valid gun sizes corresponding to each of the weld approach direction to the weld point. The procedure is repeated for each of the plurality of weld points of the weld operation and a set of weld gun sizes corresponding to the weld operation is selected based on set of valid weld gun sizes corresponding to each of the weld points. Finally, a weld gun for performing the weld operation is selected based on the set of weld gun sizes corresponding to the welding operation and user defined parameters.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for estimating the geometrical parameters defining the size of a weld gun suitable for a welding operation is merely exemplary in nature, and is in no way intended to limit the invention or its applications or uses.

Figure 1:
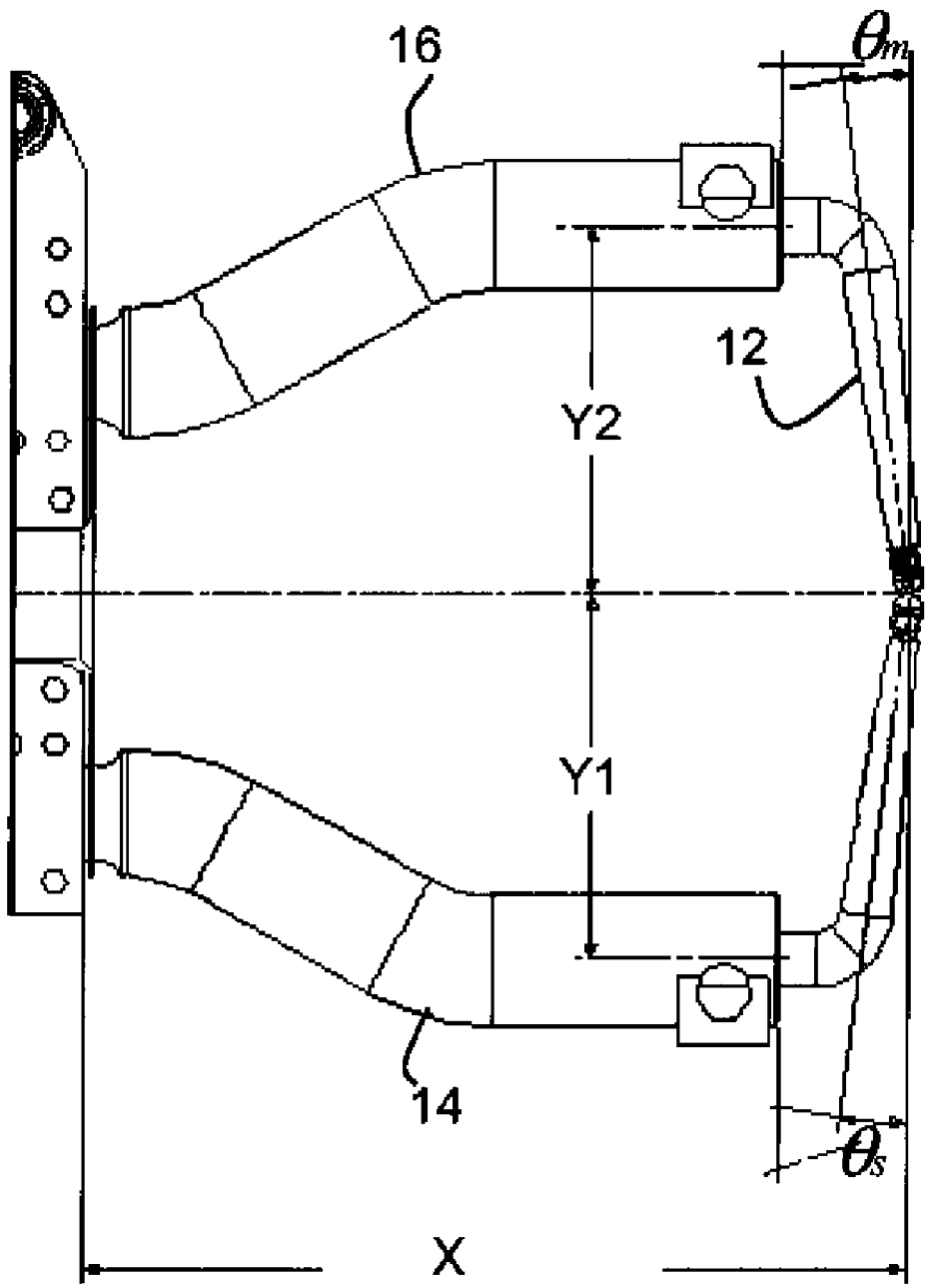
FIG. 1 illustrates geometrical parameters of a throat area for a pinch (P) type weld gun.

FIG. 1 depicts a throat area 10 of a weld gun illustrating a plurality of geometric parameters that define the throat area 10. For the purpose of this description, a pinch (P) type weld gun has been used. The plurality of geometric parameters include the tip angles $\theta_s$ for a stationary arm 14 and $\theta_m$ for a moving arm 16 of the weld gun, an arm stick-out X of the weld gun, an arm offset Y2 of the moving arm 16 of the weld gun and an arm offset Y1 of the stationary arm 14 of the weld gun. The space available around the various weld points in a welding operation largely decides the various dimensions of a weld gun that would be suitable for the particular welding operation. Hence, the allowable values of the various geometric parameters defined above for a welding operation are used to select a suitable weld gun for that welding operation. A method for calculating the allowable values of these geometric parameters for a weld point in a welding operation and then selecting a suitable weld gun for the welding operation corresponding to the values of these parameters is as described below.

Figure 2:
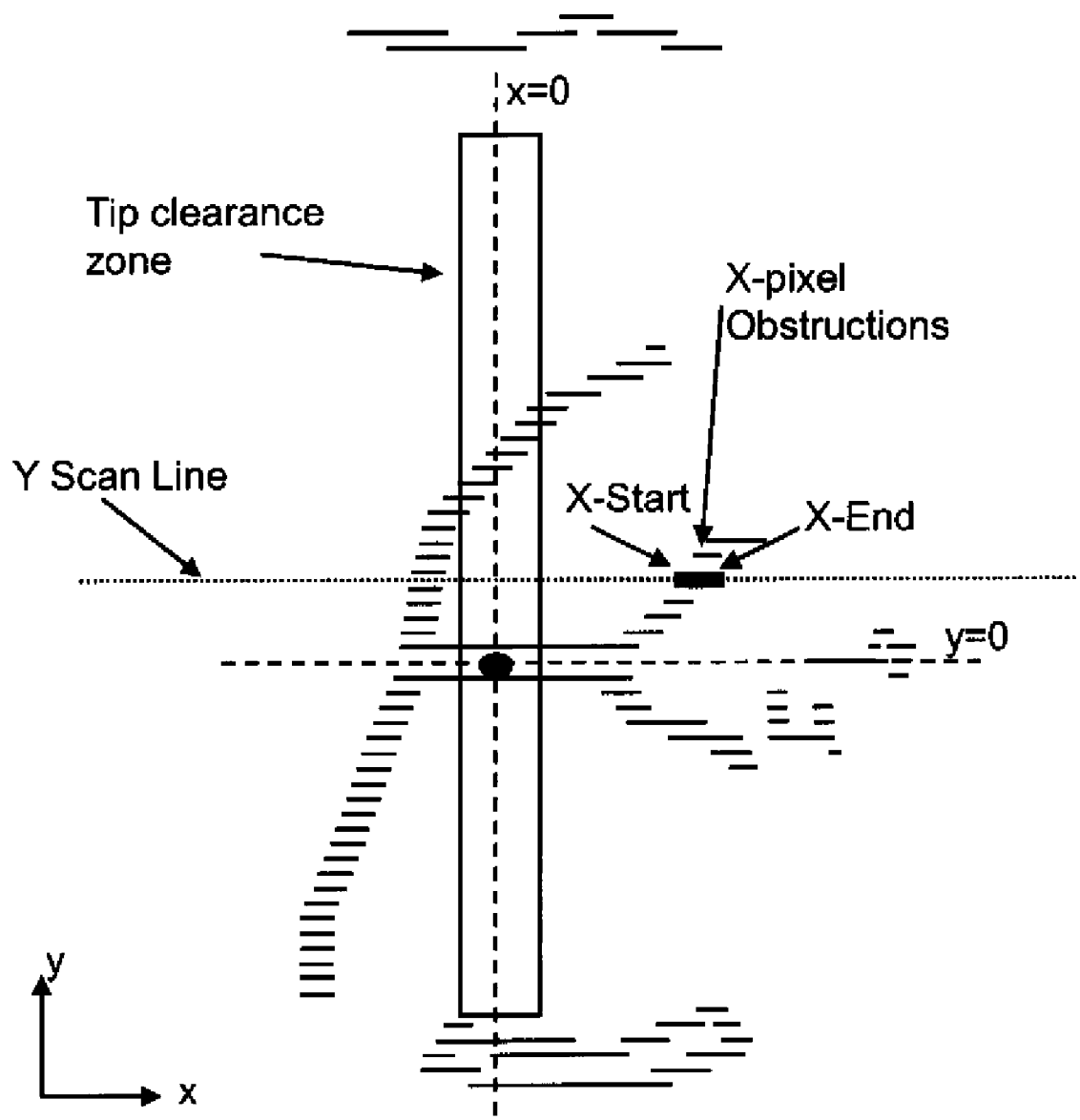
FIG. 2 is a scan line representation of part section curves illustrating a tip clearance zone corresponding to a weld point.

In one embodiment, the method for estimating the values of the above-mentioned geometric parameters for one of the weld points of the plurality of weld points in a welding operation for one direction of approach of the weld gun is described. In this embodiment, the method is said to be carried out in a UG-NX environment. However, it will be readily apparent to a person of ordinary skill in the art that software other than UG-NX can also be used. While carrying out the welding operation, there should be no interference of the weld gun with the geometry of the parts to be welded in the direction of approach of the weld gun towards the weld point. To ensure this, part section curves of the weld parts in a weld gun approach direction to a weld point are generated. The part section curves give an outline of how a part to be welded extends around the weld point and are generated using a plane containing the weld gun approach direction to the weld point and a normal to the weld point. The part section curves are then digitized by storing them as obstructions in the form of a link list in an array of Y scan lines, as shown in FIG. 2. The scan lines store the data of the part section curves in the form of pixel values and represent this data in a two-dimensional coordinate system, say (x, y), as shown in FIGS. 2, 3, 4 and 5.

In the coordinate system shown in these figures, the origin is taken to be at the weld point, the arm stick-out (X) is measured along the X-axis and the arm offset (Y1 and Y2) is measured along the Y-axis. The values of the various geometrical parameters of the weld gun are determined using the part section curves and the process for the same is as follows.

Figure 3:
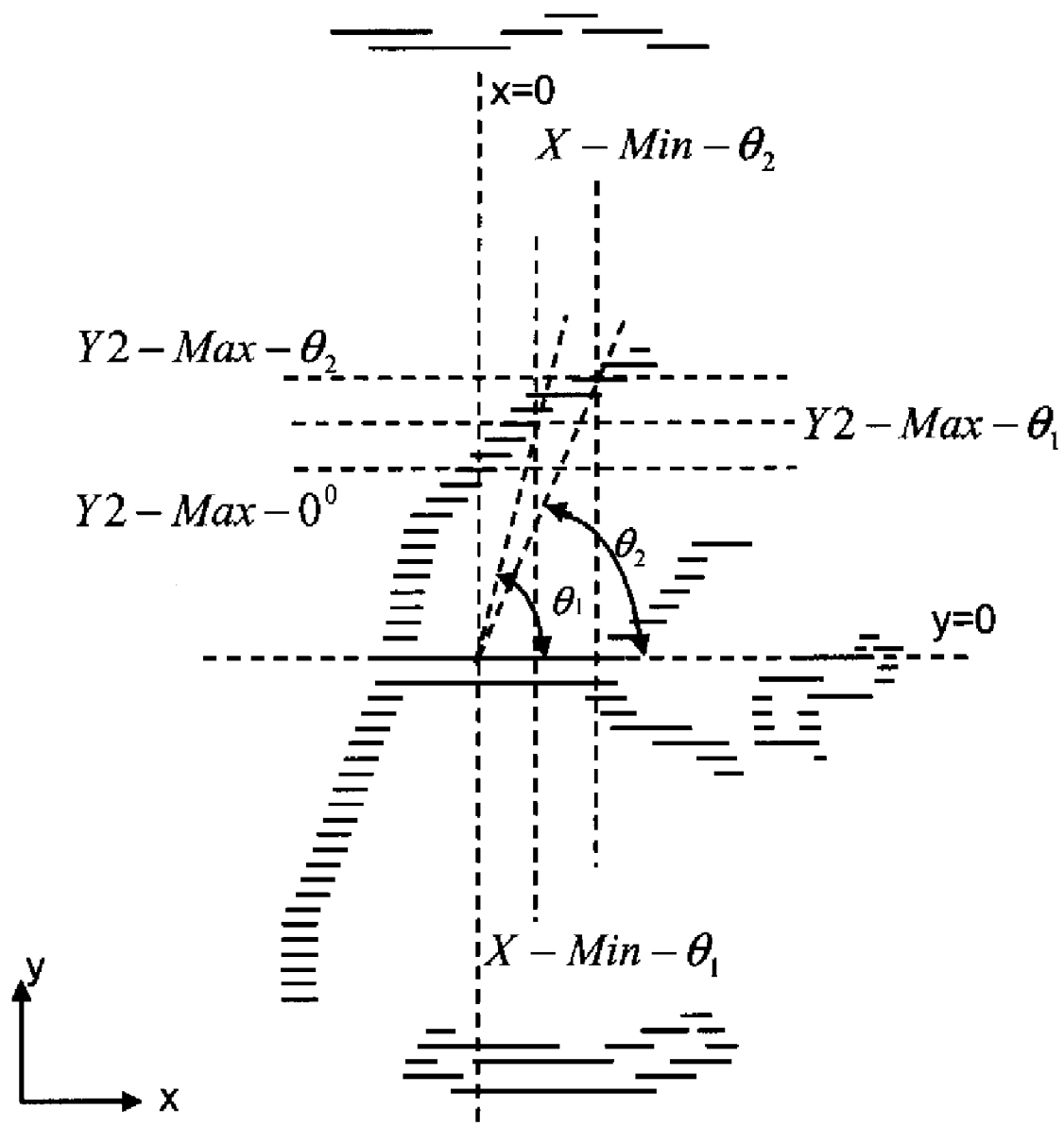
FIG. 3 is a scan line representation of part section curves illustrating estimation of tip angle for a moving arm.

The tip angle of the shank 12 of the weld gun is determined based on the presence of the part section curves in a three-dimensional cylindrical zone around the weld point. The three-dimensional cylindrical zone represents the area around the weld point that is available for the movement of the tip of the weld gun. This area is termed as the tip clearance zone and is shown in FIG. 2. When there is no part section curves present in the tip clearance zone, then the weld gun with a zero tip angle of the shank 12 is required to perform the welding operation. The tip angle of the shank 12 of a weld gun is said to be zero when it has a straight shank. In a scenario, when the part section curve is present in the tip clearance zone, a weld gun with a bent shank is required to perform the welding at the weld point. The procedure for calculating tip angle for moving shank is shown in FIG. 3. Draw line from the weld point at different standard tip angle values ($\theta_1, \theta_2, \ldots$) and calculate the X and Y values for its intersection with part section curves. Choose the tip angle with maximum Y value of intersection. The above process is also used to estimate tip angle of the shanks for stationary arm.

The tip angles obtained above are used to determine the first minimum limit on the arm stick-out (X-Min) of the weld gun. The first minimum limit on the arm stick-out (X-Min) is taken as zero when the weld gun with a straight shank is selected. For the weld gun with a bent shank the first minimum value of the arm stick-out (X-Min) is taken to be equal to X-Min $\theta$, where $\theta$ is the larger of the tip angles for stationary and moving arms of the weld gun. The first maximum value of the arm stick-out X-Max is taken as sum of minimum possible value of X-ARM-STICKOUT or arm stick-out, hereinafter used interchangeably, for a weld gun type being used, length of the weld gun frame of the weld gun type along the x-direction, and tolerance values for the weld gun type. Examples of weld gun types that can be used in this invention include, but are not limited to, P-type guns, X type guns, C-type guns and S-type guns.

Figure 4:
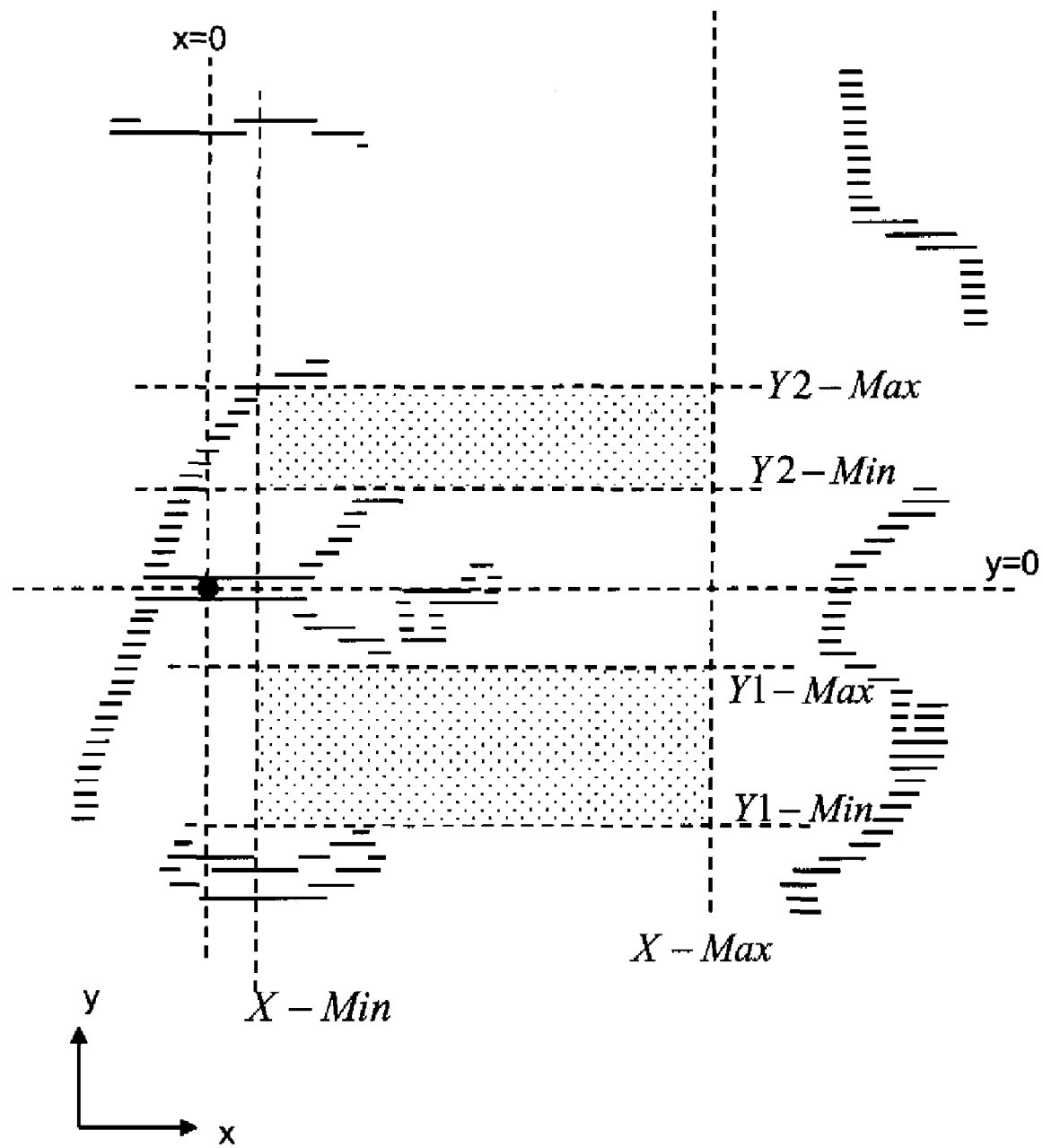
FIG. 4 is a scan line representation of part section curves illustrating the initial arm offset limits for a weld gun corresponding to a weld point.
Figure 5:
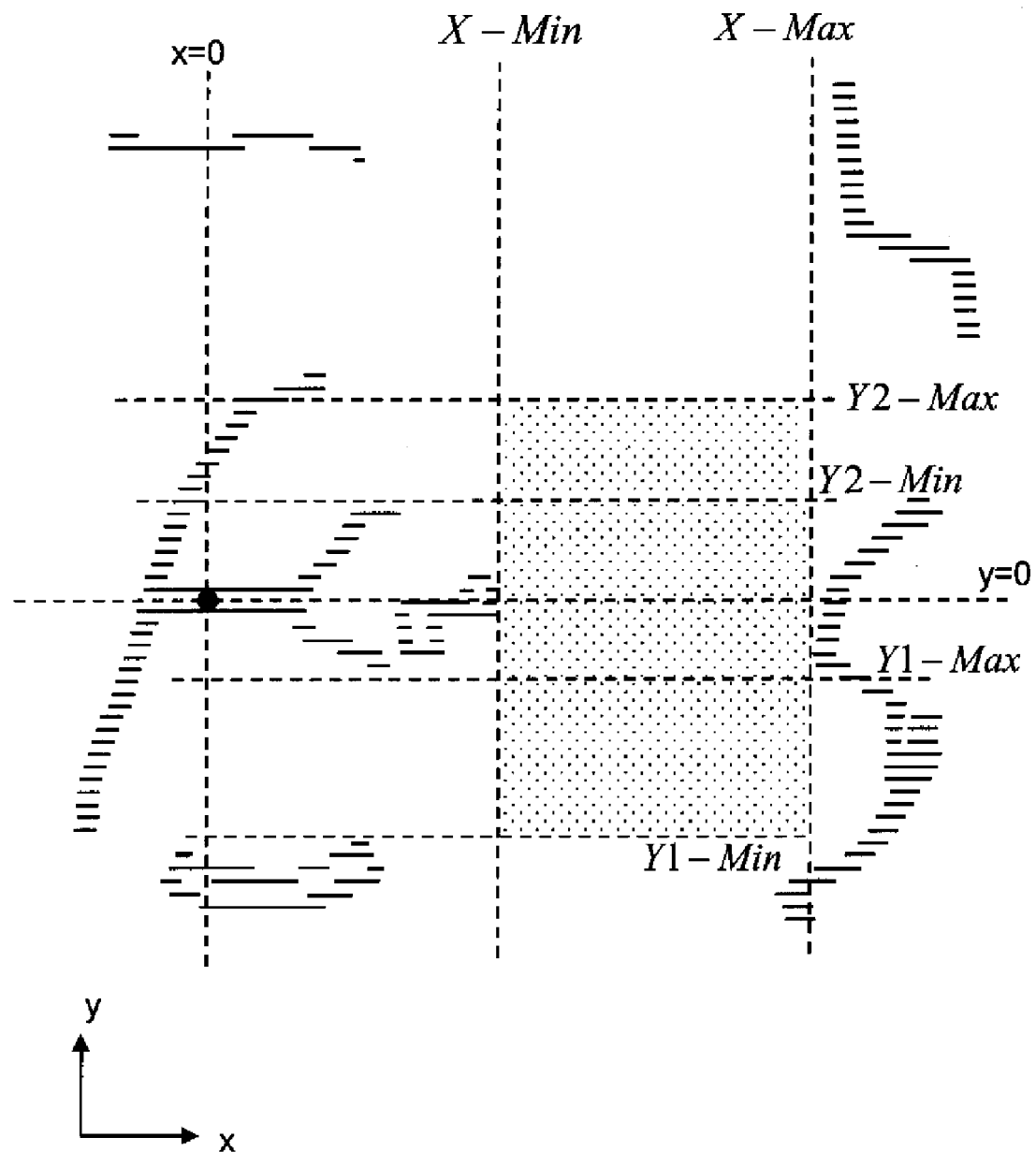
FIG. 5 is a scan line representation of part section curves illustrating the iteratively calculated arm stick-out limits for a weld gun corresponding to a weld point.

Further, a minimum and a maximum value of the arm offsets (Y1 and Y2) of the weld gun arms 14 and 16 are determined based on the part section curves between the first minimum and first maximum values of the arm stick-out, that is, X-Min and X-Max, respectively, as shown in FIG. 4. The minimum values of Y1 and Y2 are determined on the basis of a first y scan line, which does not have any X-pixels between X-Min and X-Max. The minimum values of Y1 and Y2 should be greater than the corresponding minimum values of the arm offset of the moving arm 16 and the stationary arm 14 of the specified weld gun type with clearance space as required. The maximum values of Y1 is determined on the basis of a first y scan line after Y1-min, which has one or more X-pixels between X-Min and X-Max. Similarly the maximum value of Y2 is determined. The maximum and minimum values of Y1 and Y2 define the clearance space available for the weld gun to access the weld point in the y direction. If the clearance space obtained based on the calculated values of the arm offset limits is too small for the weld gun type, a valid weld gun of the selected type can not be selected. This combination of values will give the initial clearance space for arm offset of the weld gun arms.

Now, for more accurate determination of the various geometrical parameters, the values of the arm stick-out limits for the weld gun are again calculated based on the arm offset limits obtained above. The second minimum limit for the arm stick-out is determined as the maximum limit of x pixel value along each scan line between maximum values of Y1 and Y2. The second maximum limit for the arm stick-out is calculated as the minimum x pixel value of the scan line between maximum values of Y1 and Y2 greater than second minimum limit for the arm stick-out. If the difference between second minimum and maximum values of arm stick-out is less than the minimum clearance space required for the weld gun type, re-estimation of various arm stick-out limits is done based on a standard weld gun, which can be similar or different to the standard weld gun used for the validation of the arm offset limits. This gives the valid combination of the arm stick-out values for the weld gun. The above outlined process of iterative calculation of the arm stick-out limits has been graphically represented in FIG. 5.

The above described procedure of calculation of the arm stick-out limits and arm offset limits is repeated with the modified values of each, until each of the valid values of the arm stick-out limits converges to a corresponding single value and each of the valid values of the arm offset limits converges to a corresponding single value. The converged valid values of the arm stick-out limits and the arm offset limits are then finalized for use in the further gun selection procedure.

Figure 6:
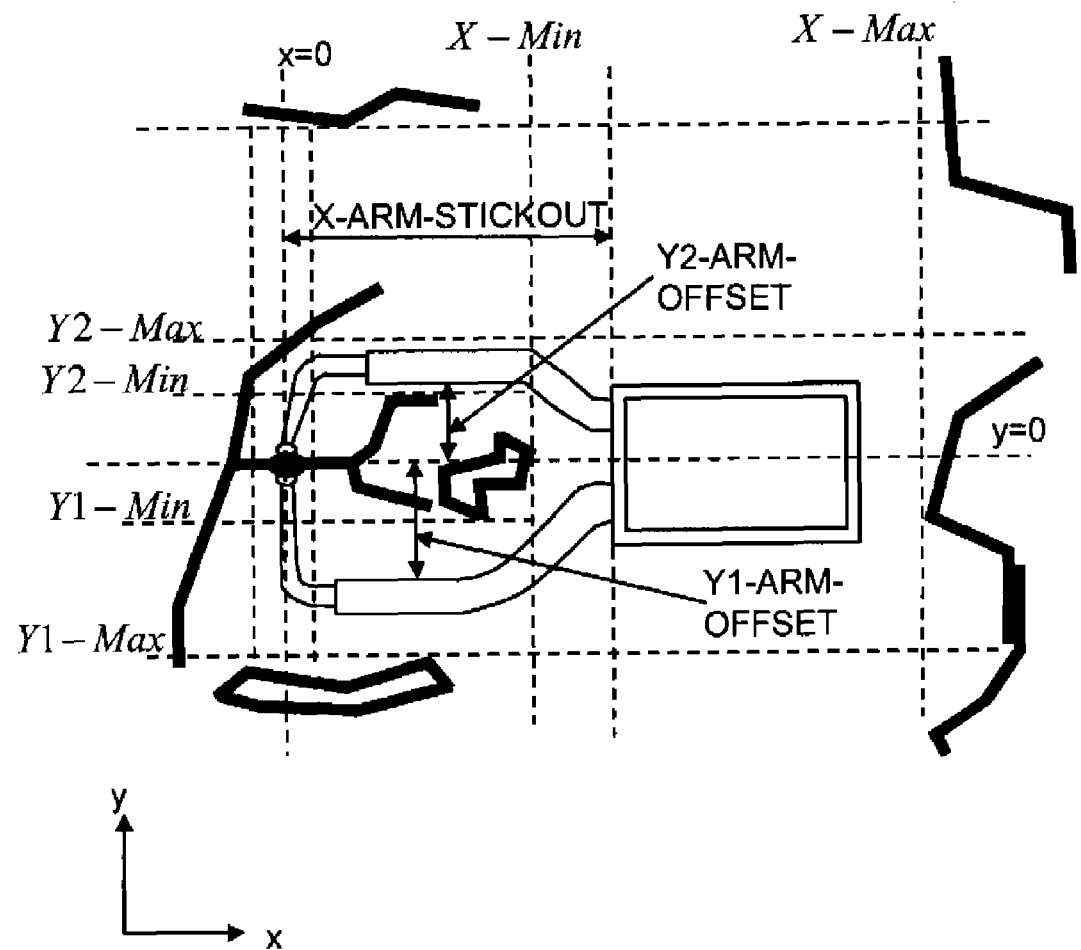
FIG. 6 illustrates a pinch (P) type weld gun of feasible dimensions for a weld operation.

The finalized values of the of the arm stick-out limits and the arm offset limits and the tip angles of the weld gun gives the clearance space bounds around the weld point for the weld gun approach direction. These bounds are mapped to the throat parameters of standard weld guns of a given weld gun type. While mapping the clearance space bounds on to the throat parameters of the standard weld guns of the given weld gun type, there should be enough tolerances to accommodate for the shank and arm thickness, the weld gun frame, the weld gun opening and the weld gun closing. Moreover, the clearance space bound should take care of any additional gap on account of the shape of throat area of the weld gun of the gun type. In an exemplary embodiment the method associated with the mapping of the clearance space bounds with the throat parameters of a P-type gun is as illustrated in FIG. 6 and as described below.

Let the tolerance to accommodate for shank/arm thickness and some extra clearance be $\epsilon$.

The required tip angle (estimated separately for moving and stationary arm) of the weld gun is determined as described above. Along weld gun length the difference between a X-ARM-STICKOUT of the P-type weld gun and a minimum value of the arm stick-out should be greater then the tolerance value $\epsilon$. The difference between a maximum value of the arm stick-out and the combined value of the X-ARM-STICKOUT and the weld gun frame length should be greater than the tolerance value $\epsilon$. These conditions are as shown in the equations below.

$$X\text{-ARM-STICKOUT} - (X\text{-Min}) > \epsilon$$

$$(X\text{-Max}) - (X\text{-ARM-STICKOUT} + \text{Weld Gun frame length}) > \epsilon$$

Along the moving arm of the gun the difference between the arm offset or a Y2-ARM-OFFSET of the P-type weld gun and a minimum value of Y2 should be greater than the tolerance value $\epsilon$. The difference between a maximum value of Y2 and the combined value of the Y2-ARM-OFFSET and weld gun stroke opening is greater than the tolerance value $\epsilon$. These conditions are shown in the equations below.

$$(Y2\text{-ARM-OFFSET}) - (Y2\text{-Min}) > \epsilon$$

$$(Y2\text{-Max}) - (Y2\text{-ARM-OFFSET} + \text{Weld Gun stroke opening}) > \epsilon$$

Along the stationary arm 14 of the weld gun the difference between the arm offset or a Y1-ARM-OFFSET of the P-type weld gun and a minimum value of Y1 should be greater than the tolerance value $\epsilon$. The difference between a maximum value of Y1 and value of the Y1-ARM-OFFSET is greater than the tolerance value $\epsilon$. These conditions are shown in the equations below.

$$(Y1\text{-ARM-OFFSET}) - (Y1\text{-Min}) > \epsilon$$

$$(Y1\text{-Max}) - (Y1\text{-ARM-OFFSET}) > \epsilon$$

Based on the above mapping, a set of valid weld gun sizes is determined corresponding to the weld gun approach direction to the weld point. Similarly, different sets of weld gun sizes are determined corresponding to each of the weld gun approach direction to the weld point. The final set of weld gun sizes corresponding to the weld point contains all the unique weld gun sizes shortlisted for each weld gun approach direction for the weld point. Similarly, a plurality of final sets of the weld gun sizes corresponding to each weld point of the weld operation is determined. The method for selecting the final weld gun sizes from the various sets of weld gun sizes shortlisted above, suitable for a weld operation, is described below. Let an $i^{th}$ weld point be represented as $w_i$ and a $j^{th}$ weld gun approach direction be represented $d_j$. Hence, the set of weld gun sizes for the $i^{th}$ weld point in the $j^{th}$ weld gun approach direction can be written as:

$$G\text{-Size}(w_i, d_j)$$

Now, valid weld gun sizes for weld point $w_i$ (for m weld gun approach directions) can be written as:

$$G\text{-Size}(w_i) = G\text{-Size}(w_i, d_1) \cup G\text{-Size}(w_i, d_2) \ldots \cup G\text{-Size}(w_i, d_m)$$

Hence, valid weld gun sizes for a welding operation $wo_i$ (for n weld points) can be written as:

$$G\text{-Size}(wo_i) = G\text{-Size}(w_1) \cap G\text{-Size}(w_2) \ldots \cap G\text{-Size}(w_n)$$

The final weld gun best suited to perform a weld operation is selected from the final valid gun sizes based on the user defined parameters. The user defined parameters are selected from a group comprising, but not limited to, weld gun size, weld gun cost, and on a list of common weld guns or existing guns and combination thereof.

Figure 7:
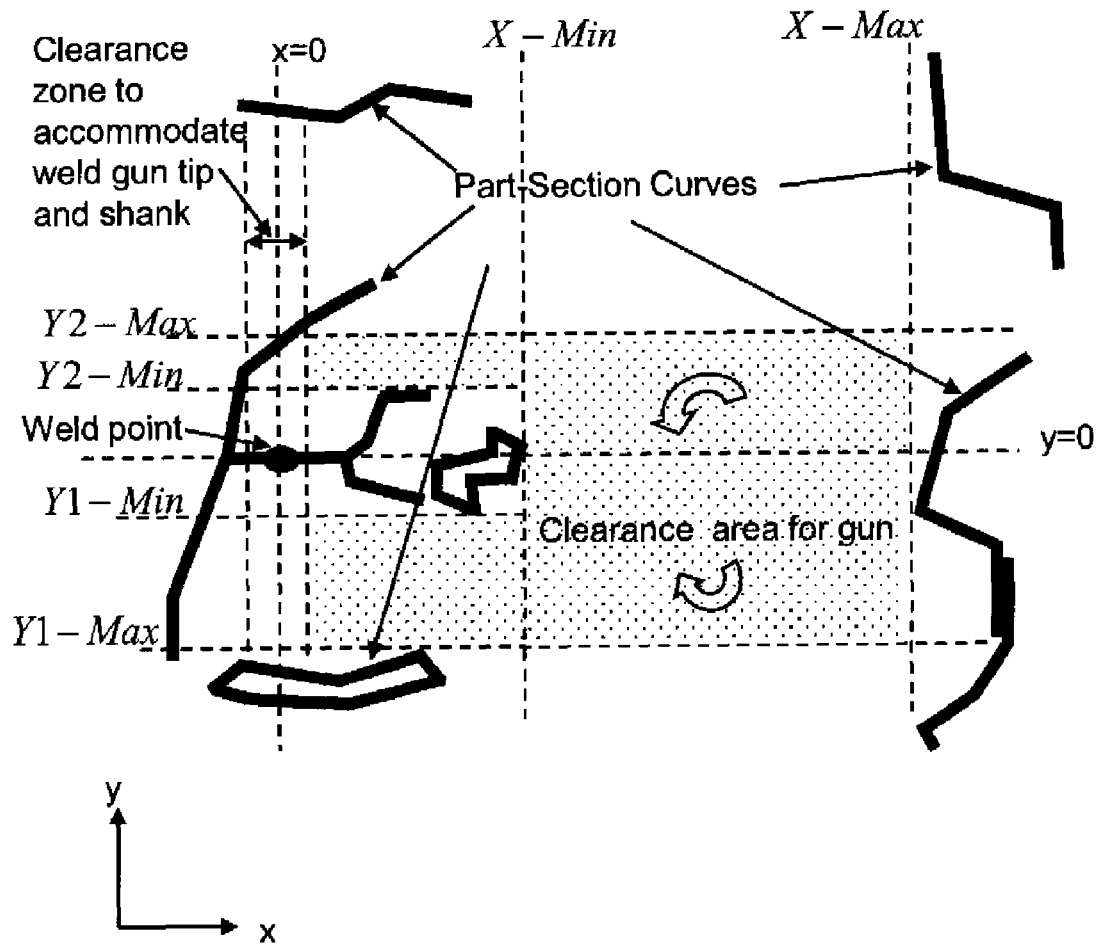
FIG. 7 is an exemplary depiction of the various geometrical parameters of a weld gun and part section curves used in their calculation.

FIG. 7 is an exemplary depiction of the various geometrical parameters of the weld gun that are calculated using the present invention and are in turn used to select a suitable weld gun for a welding operation. Also shown in the figure are the exemplary part section curves used for the calculation of the various geometrical parameters of the weld gun. The graph also illustrates an area depicting the clearance zone provided around a weld point for the weld gun to exist and perform welding.

Various embodiments of the present invention offer one or more advantages. The present invention provides a method for automatically selecting a weld gun for a welding operation. The method of the present invention provides a quick way to find the right size gun for a welding operation. Further, the method finds all the feasible gun sizes (range of each parameter value) for a welding operation, and user can select a gun based on appropriate criteria, such as lightest or cheapest and existing stock. This reduces design iterations and also enables optimization in gun selection.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating final values of a plurality of geometric parameters of a weld gun, wherein the plurality of geometric parameters define the size of the weld gun, wherein the weld gun performs a welding operation at a weld point, said method comprising:

a. generating part section curves corresponding to a direction of approach of the weld gun to the weld points, wherein the part section curves are generated by using a part section plane, and wherein the part section plane is a plane containing the weld gun approach direction and a normal to the weld point;

b. storing the part section curves as a link list of obstructions in an array of Y scan lines to analyze a given part geometry for available clearance space;

c. determining values of a first geometric parameter of the plurality of geometric parameters, wherein the value of the first geometric parameter is determined based on the presence of the part section curves in a pre-defined area;

d. estimating a first maximum and a first minimum limit for a second geometric parameter of the plurality of geometric parameters, wherein the first minimum limit for the second geometric parameter is determined based on the limit for the first geometric parameter, and wherein the first maximum limit of the second geometric parameter is determined based on the type of weld gun used;

e. estimating a maximum and a minimum limit for a third geometric parameter of the plurality of geometric parameters, wherein the maximum limit for the third geometric parameter is calculated based on the value of the first geometric parameter and the first maximum and the first minimum limit for the second geometric parameter, and wherein the minimum limit for the third geometric parameter is estimated based on the first maximum and the first minimum limit for the second geometric parameter, and wherein the maximum and the minimum limit for the third geometric parameter are calculated based on the part section curves;

f. estimating a valid maximum and a valid minimum limit for the third geometric parameter based on a value of the third geometric parameter for a first standard weld gun;

g. computing a second maximum and a second minimum limit for the second geometric parameter corresponding to the valid maximum and the valid minimum limit for the third geometric parameter, wherein the second maximum and the second minimum limit for the second geometric parameter are calculated based on the part section curves;

h. estimating a valid maximum and a valid minimum limit for the second geometric parameter based on a limit for the second geometric parameter of a second standard weld gun; and i. repeating the steps e, f, g and h until each of the valid maximum and the valid minimum limit for the second geometric parameter converge and each of the valid maximum and the valid minimum limit for the third geometric parameter converge, wherein the first maximum and the first minimum limit for the second geometric parameter are replaced with the valid maximum and the valid minimum limits for the second geometric parameter, respectively, and wherein the limit for the first geometric parameter, the converged valid minimum limit for the second geometric parameter, the converged valid maximum limit for the second geometric parameter, the converged valid minimum limit for the third geometric parameter and the converged valid maximum limit for the third geometric parameter are the estimated final limits for the plurality of geometric parameters.

2. The method according to claim 1 wherein the first maximum limit for the second geometrical parameter is taken as a sum of a minimum limit for the second geometrical parameter for the type of weld gun used, length of the gun frame for the type of weld gun used, and a value of tolerance for the type of weld gun used.

3. The method according to claim 1 wherein the method is carried out in a UG-NX design software.

4. The method according to claim 1 wherein the type of weld gun is selected from a group comprising a P type weld gun, a C type weld gun, an X type weld gun and an S type weld gun.

5. The method according to claim 1 wherein the first geometric parameter is a tip angle of shanks for stationary and moving arms of the weld gun.

6. The method according to claim 5 wherein the second geometric parameter is an arm stick-out of the weld gun.

7. The method according to claim 6 wherein the third geometric parameter is an arm offset corresponding to a moving arm and stationary arm of the weld gun.

8. The method according to claim 1 wherein a number of weld gun approach directions to the weld point is defined by a user.

9. A method for estimating a set of valid weld gun sizes for an approach direction of a weld gun to a weld point, wherein final values of a plurality of geometric parameters define the weld gun size, and wherein the plurality of geometric parameters include a tip angle of a shank for moving and stationary arms of the weld gun, an arm stick-out of the weld gun, and arm offset of moving and stationary arms of the weld gun, and wherein the weld gun performs a welding operation at the weld point, said method comprising:

a. generating part section curves corresponding to the weld gun approach direction to the weld point, wherein the part section curve is generated by using a part section plane, and wherein the part section plane is the plane containing the weld gun approach direction and a normal to the weld point;

b. storing the part section curves as a link list of obstructions in an array of Y scan lines to analyze a given part geometry for available clearance space;

c. determining a value of the tip angle of the shank for moving and stationary arms of the weld gun, wherein the value of the tip angle of the shank is determined based on the presence of the part section curve in a three-dimensional cylindrical zone around the weld point;

d. estimating a first maximum and a first minimum limit for the arm stick-out, wherein the first minimum limit for the arm stick-out is determined based on the value of the tip angle of the shank of the weld gun and the first maximum limit for the arm stick-out is determined based on the type of weld gun used;

e. estimating a maximum and a minimum limit for the arm offset, wherein the maximum limit for the arm offset is calculated based on the limit for the tip angle of the shank of the weld gun and the first maximum and the first minimum limit for the arm stick-out, and wherein the minimum limit for the arm offset is estimated based on the first maximum and the first minimum limit for the arm stick-out, and wherein the maximum and the minimum limit for the arm offset are calculated based on the part section curves;

f. estimating a valid maximum and a valid minimum limit for the arm offset on the basis of a value of the arm offset for a first standard weld gun;

g. computing a second maximum and a second minimum limit for the arm stick-out based on the valid maximum and the valid minimum limit for the arm offset, wherein the second maximum and the second minimum limit for the arm stick-out are calculated on the part section curves;

h. estimating a valid maximum and a valid minimum limit for the arm stick-out based on the a limit for the arm stick-out for a second standard weld gun;

i. repeating the steps e, f, g and h until each of the valid maximum and the valid minimum values of the arm stick-out converge and each of the valid maximum and the valid minimum values of the arm offset converge, wherein the first maximum and the first minimum values of the arm stick-out are replaced with the valid maximum and the valid minimum values of the arm stick-out, respectively, and wherein the limit for the tip angle of the shank, the converged valid minimum limit for the arm stick-out, the converged valid maximum value of the arm stick-out, the converged valid minimum value of the arm offset and the converged valid maximum limit for the arm offset are the final limits for the plurality of geometric parameters; and j. estimating the set valid weld gun sizes for the approach direction of the weld gun to the weld point, wherein the set of valid weld gun sizes is estimated by mapping the final values of the plurality of geometric parameters onto a set of standard weld guns of the type of weld gun used.

10. The method according to claim 9 wherein the first maximum value of the arm stick-out is taken as a sum of a minimum limit for the arm stick-out for the type of weld gun used, length of a weld gun frame for the type of weld gun used and a limit for tolerance for the type of weld gun used.

11. The method according to claim 9 wherein the method is carried out in a UG-NX design software.

12. The method according to claim 9 wherein the type of weld gun is selected from a group comprising a P type weld gun, a C type weld gun, an X type weld gun and an S type weld gun.

13. The method according to claim 9 wherein a number of weld gun approach directions to the weld point is defined by a user.

14. A method for selecting a weld gun corresponding to a welding operation, wherein the weld gun is selected based on the final values of a plurality of geometric parameters of the weld gun, and wherein the plurality of geometric parameters define the size of the weld gun, and wherein the plurality of geometric parameters comprises a tip angle of a shank of moving and stationary arms of the weld gun, an arm stick-out of the weld gun, and an arm offset of the stationary and moving arms of the weld gun, and wherein a welding operation comprises a plurality of weld points, said method comprising:

a. generating part section curves corresponding to a direction of approach of the weld gun to a weld point of the plurality of weld points, wherein the part section curve is generated by using a part section plane, and wherein the part section plane is a plane containing the weld gun approach direction and a normal to the weld point;

b. storing the part section curves as a link list of obstructions in an array of Y scan lines to analyze a given part geometry for available clearance space;

c. determining values of the tip angle of the shank of stationary and moving arms of the weldgun, wherein the values of the tip angle of the shank are determined based on the presence of the part section curves in a three-dimensional cylindrical zone around the weld point;

d. estimating a first maximum and a first minimum limit for the arm stick-out, wherein the first minimum limit for the arm stick-out is determined based on the limit for the tip angle of the shank of the weld gun and wherein the first maximum value of the arm stick-out is determined based on the type of weld gun used;

e. estimating a maximum and a minimum limit for the arm offset wherein the maximum limit for the arm offset is calculated based on the limit for the tip angle of the shank of the weld gun and the first maximum and the first minimum value of the arm stick-out, and wherein the minimum limit for the arm offset is estimated based on the first maximum and the first minimum limit for the arm stick-out, wherein the maximum and the minimum limit for the arm offset are calculated based on the part section curves;

f. estimating the valid maximum and valid minimum limit for the arm offset based on a value of the arm offset for a first standard weld gun;

g. computing a second maximum and a second minimum limit for the arm stick-out based on the valid maximum and the valid minimum limit for the arm offset, wherein the second maximum and the second minimum limit for the arm stick-out are calculated based on the part section curves;

h. estimating a valid maximum and a valid minimum limit for the arm stick-out based on a value of the arm stick-out of a second standard weld gun;

i. repeating the steps e, f, g and h until each of the valid maximum and the valid minimum values of the arm stick-out converge and each of the valid maximum and the valid minimum values of the arm offset converge, wherein the first maximum and the first minimum values of the arm stick-out are replaced with the valid maximum and the valid minimum values of the arm stick-out, respectively, and wherein the value of the tip angles of the shank, the converged valid minimum limit for the arm stick-out, the converged valid maximum limit for the arm stick-out, the converged valid minimum limit for the arm offset and the converged valid maximum limit for the arm offset are the final values of the plurality of geometric parameters;

j. selecting a set of valid weld gun sizes corresponding to a weld gun approach direction to the weld point, wherein the set of valid weld gun sizes is estimated by mapping the final values of the plurality of geometric parameters onto a set of standard weld guns of the type of weld gun used;

k. performing the steps of a, b, c, d, e, f, g, h, i and j for each of the weld gun approach direction to the weld point of the plurality of weld points;

l. obtaining a set of weld gun sizes corresponding to the weld point based on the set of valid gun sizes corresponding to each of the weld approach direction to the weld point;

m. performing the steps of a, b, c, d, e, f, g, h, i, j, k and l for each of the plurality of welding points of the welding operation;

n. obtaining a set of weld gun sizes corresponding to the welding operation based on the set of valid gun sizes corresponding to each of the weld point; and o. selecting a weld gun for performing the weld operation, wherein the weld gun is selected based on the set of weld gun sizes corresponding to the welding operation.

15. The method according to claim 14 wherein the first maximum limit for the arm stick-out is taken as a sum of a minimum limit for the arm stick-out for the type of weld gun used, length of a weld gun frame for the type of weld gun used and a value of tolerance for the type of weld gun used.

16. The method according to claim 14 wherein the method is carried out in a UG-NX design software.

17. The method according to claim 14 wherein the type of weld gun used is selected from a group comprising a P type weld gun, a C type weld gun, an X type weld gun and an S type weld gun.

18. The method according to claim 14 wherein a number of weld gun approach directions to the weld point is defined by a user.

19. The method according to claim 14 wherein selecting a weld gun for performing the welding operation is done on the basis of a plurality of user defined parameters.

20. The method according to claim 19 wherein the user defined parameters are selected from a group comprising a weld gun cost, a weld gun size and a list of available weld guns.

* * * * *